United States Patent [19]
Wood et al.

[11] Patent Number: 6,038,105
[45] Date of Patent: Mar. 14, 2000

[54] TEMPERATURE-COMPENSATED ROTARY ACTUATOR CARTRIDGE BEARING STABLIZER

[75] Inventors: Roy L. Wood, Yukon; John D. Stricklin, Oklahoma City; Nigel F. Misso, Bethany, all of Okla.

[73] Assignee: Seagate Technology, Inc.

[21] Appl. No.: 09/104,616

[22] Filed: Jun. 25, 1998

Related U.S. Application Data

[60] Provisional application No. 60/067,694, Dec. 1, 1997, abandoned.

[51] Int. Cl.⁷ ........................................................ G11B 5/55
[52] U.S. Cl. ................................................................ 360/106
[58] Field of Search ............................. 360/106; 384/518, 384/519, 535, 536

[56] References Cited

U.S. PATENT DOCUMENTS

| | | | |
|---|---|---|---|
| 5,570,250 | 10/1996 | Casey | 360/106 |
| 5,666,242 | 9/1997 | Edwards et al. | 360/106 |
| 5,675,456 | 10/1997 | Myers | 360/106 |
| 5,731,934 | 3/1998 | Brooks et al. | 380/106 |
| 5,818,665 | 10/1998 | Malagrino, Jr. et al. | 360/106 |
| 5,894,382 | 4/1999 | Hyde | 360/106 |
| 5,914,837 | 6/1999 | Edwards et al. | 360/106 |
| 5,930,071 | 7/1999 | Back | 360/97.01 |

*Primary Examiner*—Jefferson Evans
*Attorney, Agent, or Firm*—Shawn B. Dempster; Edwards P. Heller, III; Jonathan E. Olson

[57] ABSTRACT

An improved attachment of an actuator E-block of an actuator assembly to a pivot bearing assembly for a disc drive, the E-block having a central bore having a pair of alignment edges to pressingly engage a cartridge bearing of the pivot shaft bearing assembly, and the cartridge bearing supporting a canted coil spring within a peripheral groove so that the spring is interposed between the cartridge bearing and the E-block within the E-block bore. One or more fasteners extend through the wall of the E-block adjacent the alignment edges to pressingly engage the cartridge bearing against the alignment edges, the canted coil spring filling the clearance gap between the cartridge bearing and the E-block bore to provide a resilient support to the E-block.

19 Claims, 4 Drawing Sheets

TEMPERATURE-COMPENSATED ROTARY ACTUATOR CARTRIDGE BEARING STABLIZER

RELATED APPLICATIONS

This application claims the benefit of U.S. Provisional Application No. 60/067,694, entitled CANTED COIL SPRING BEARING CARTRIDGE MOUNTING, filed Dec. 1, 1997.

FIELD OF THE INVENTION

The present invention relates generally to the field of disc drive data storage devices, and more particularly but not by way of limitation, to an improved apparatus for attachment of a cartridge bearing assembly to an actuator arm assembly.

BACKGROUND OF THE INVENTION

Modern disc drives are commonly used in a multitude of computer environments, ranging from super computers to notebook computers, to store large amounts of data in a form that is readily available to a user. Typically, a disc drive has one or more magnetic discs that are rotated by a spindle motor at a constant high speed. Each disc has a data storage surface divided into a series of generally concentric data tracks that are radially spaced across a band having an inner diameter and an outer diameter. The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer. The interactive element senses the magnetic transitions on a selected data track to read the data stored on the track. Alternatively, the interactive element transmits an electrical signal that induces magnetic transitions on the selected data track to write data to the track.

Each of the read/write heads is mounted to a rotary actuator arm and is selectively positioned by the actuator arm over a pre-selected data track of the disc to either read data from or write data to the data track. The read/write head includes a slider assembly having an air bearing surface that, in response to air currents caused by rotation of the disc, causes the head to fly adjacent to the disc surface with a desired gap separating the read/write head and the corresponding disc.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly. The surfaces of the stacked discs are accessed by the read/write heads which are mounted on a complementary stack of actuator arms which form a part of an actuator assembly. The actuator assembly generally includes head wires which conduct electrical signals from the read/write heads to a flex circuit which, in turn, conducts the electrical signals to a flex circuit connector mounted to a disc drive base deck.

When the disc drive is not in use, the read/write heads are parked in a position separate from the data storage surfaces of the discs. Typically, a landing zone is provided on each of the disc surfaces where the read/write heads are positioned before the rotational velocity of the spinning discs decreases below a threshold velocity which sustains the air bearing. The landing zones are generally located near the inner diameter of the discs.

Generally, the actuator assembly has an actuator body that pivots about a pivot mechanism disposed in a medial portion thereof. A motor, such as a voice coil motor, selectively positions a proximal end of the actuator body. This positioning of the proximal end in cooperation with the pivot mechanism causes a distal end of the actuator body, which supports the read/write heads, to move radially across the face of the discs. The function of the pivot mechanism is crucial in meeting performance requirements associated with the positioning of the actuator assembly. A typical pivot mechanism has two ball bearings with a stationary shaft attached to an inner race and a sleeve attached to an outer race. The sleeve is also attached to a bore in the actuator body. The stationary shaft typically is attached to the base deck and the top cover of the disc drive.

A well known problem occurs as the result of thermal cycling which alters the compressive force that retains the sleeve in the actuator body. This is especially true when many or all the components of the cartridge bearing are made of steel in order to increase the strength and wear resistance. The actuator body is typically made of aluminum or magnesium to minimize the weight and inertia. The different materials provides a differential thermal expansion, that is, the actuator and cartridge bearing expand and contract at different rates and to different extents in a given temperature range.

A solution to the differential thermal expansion problem is to provide a resilient mounting of the actuator body to the cartridge bearing, so that relative thermal expansion and contraction can occur without affecting the preload or stress on the cartridge bearing. Such a solution involves providing an eccentric bore in the actuator body so that the cartridge bearing contacts the actuator body along a minimum contact surface, the rest of the cartridge bearing thus unencumbered and free to expand and contract during thermal cycling. The primary drawback to such a solution is that by minimizing the support of the actuator body makes the actuator assembly susceptible to undesired deflection which results in positional overshooting during data seek routines due to the torsion on the actuator body.

There is a long felt need in the industry for an improved apparatus for attaching the actuator body to the cartridge bearing, the improved apparatus combining the performance benefits of the rigid attachment, which minimizes overshoot conditions, with the performance benefits of the resilient attachment, which allows for differential thermal expansion of mating components.

SUMMARY OF THE INVENTION

The present invention provides an improved attachment of an actuator E-block of an actuator assembly to a cartridge bearing of a pivot shaft bearing assembly in a disc drive.

The actuator assembly of the present invention has an E-block member which has a central bore which is sized to be supported on the outer housing of a cartridge bearing assembly, the central bore defining a pair of opposed alignment edges which operably engage the cartridge bearing housing when the E-block is supported thereon.

One or more fasteners extend through a wall of the E-block to engage the cartridge bearing housing to apply a tensile load which pressingly engages the cartridge bearing housing against the alignment edges, thereby establishing a line contact therebetween the cartridge bearing and the E-block.

The cartridge bearing housing has a peripheral groove in a medial portion thereof which receivingly supports a canted coil spring. The canted coil spring thereby extends beyond the medial diameter of the cartridge bearing housing and fills a clearance gap between the housing and the E-block within the E-block bore. The individual upstanding coils of the canted coil spring pressingly engage both the housing and the E-block so as to extend support by the cartridge bearing assembly to the E-block within the periphery of the E-block bore. The coils of the canted coil spring vary in angular attitude as the clearance between the housing and the E-block varies, so as to provide a continuous and resilient support to the E-block.

The advantages and features of the present invention will be apparent from the following description when read in conjunction with the drawings and appended claims.

DETAILED DESCRIPTION

Figure 1:
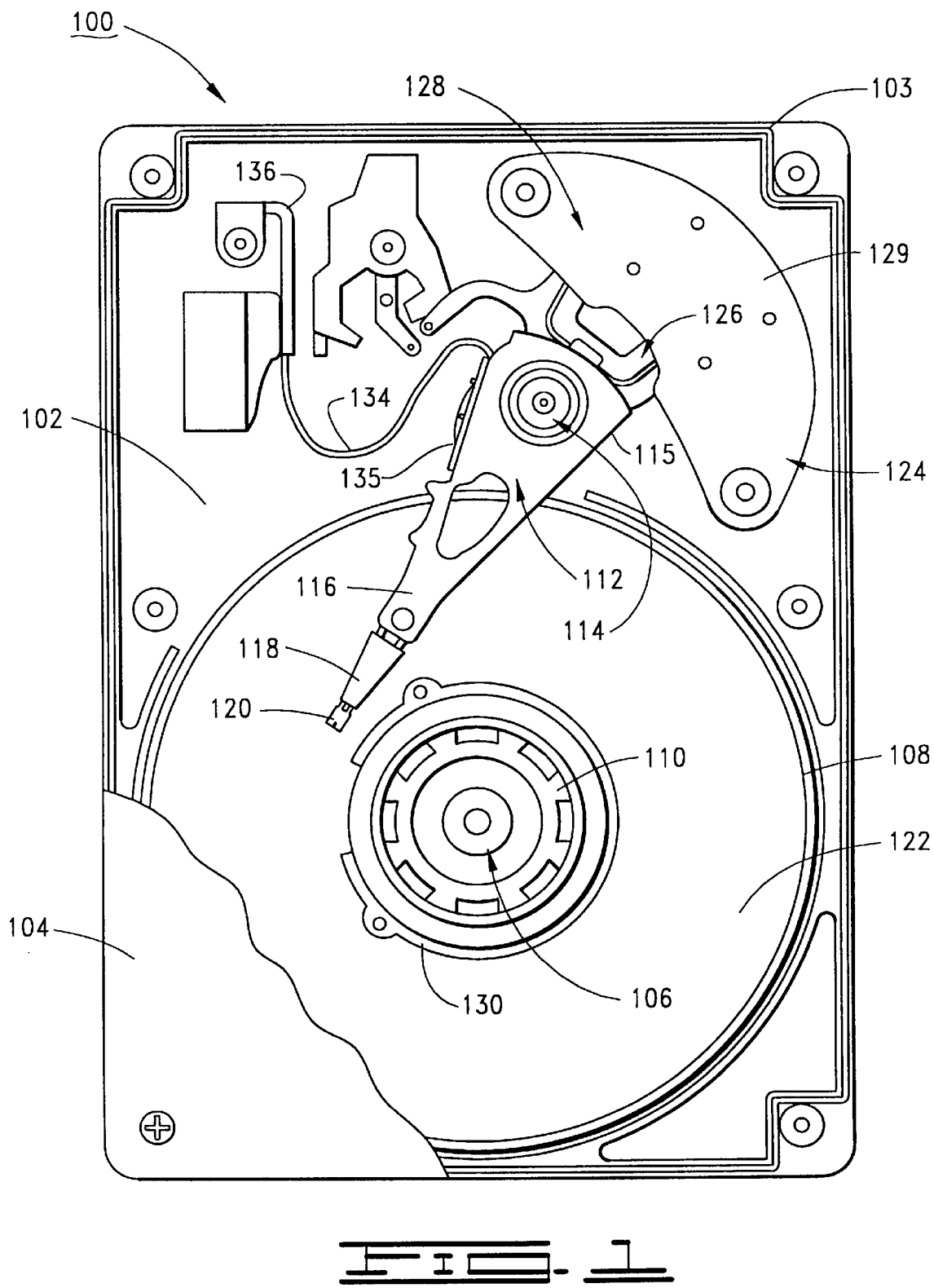
FIG. 1 is a top view of a disc drive constructed in accordance with the present invention.

Referring to the drawings in general, and more particularly to FIG. 1, shown therein is a top view of a disc drive 100 constructed in accordance with a preferred embodiment of the present invention. The disc drive 100 includes a base deck 102 to which various disc drive components are mounted, and a top cover 104, which together with the base deck 102 and a perimeter gasket 103 provide a sealed internal environment for the disc drive 100. The top cover 104 is shown in a partial cut-away fashion to expose selected components of interest. It will be understood that numerous details of construction of the disc drive 100 are not included in the following description, as such, they are well known to those skilled in the art and are believed to be unnecessary for the purpose of describing the present invention.

Mounted to the base deck 102 is a spindle motor 106 to which a plurality of discs 108 are mounted and secured by a clamp ring 110 for rotation at a constant high speed. Adjacent the discs 108 is an actuator assembly 112 which pivots about a pivot shaft bearing assembly 114, sometimes referred to as a pivot mechanism, in a rotary fashion. The actuator assembly 112 includes an E-block 115 that is supported by the pivot shaft bearing assembly 114. The E-block 115 has actuator arms 116 (only one shown) that support load arm assemblies 118. The load arm assemblies 118 in turn support read/write heads 120, with each of the heads 120 adjacent a surface of one of the discs 108. As mentioned hereinabove, each of the discs 108 has a data recording surface 122 divided into concentric circular data tracks (not shown), and the heads 120 are positionably located adjacent data tracks to read data from, or write data to, the tracks.

The actuator assembly 112 is controllably positioned by a voice coil motor assembly (VCM) 124, comprising an actuator coil 126 immersed in the magnetic field generated by a magnet assembly 128. A magnetically permeable flux path, such as a steel plate 129, is mounted above the actuator coil 126 to complete the magnetic circuit of the VCM 124. When controlled current is passed through the actuator coil 126, an electromagnetic field is set up which interacts with the magnetic circuit of the VCM 124 to cause the actuator coil 126 to move relative to the magnet assembly 128 in accordance with the well-known Lorentz relationship. As the actuator coil 126 moves, the actuator assembly 112 pivots about the pivot shaft bearing assembly 114, causing the actuator arms 116 to move the heads 120 adjacent to, and across, the discs 108. Located near the inner clamp ring 110 are parking surfaces 130, the parking surfaces 130 being non-data surfaces that are designated areas where the heads 120 come to rest when the disc drive 100 becomes non-operational, the provision of the parking surfaces 130 preventing the heads 120 from damaging any data storage locations.

To provide the requisite electrical conduction paths between the heads 120 and disc drive read/write circuitry (not shown), head wires (not separately shown) are routed on the actuator assembly 112 from the heads 120, along the load arm assemblies 118 and the actuator arms 116, to a flex circuit 134. The head wires are secured by way of a suitable soldering process to corresponding pads of a printed circuit board (PCB) 135 of the flex circuit 134. In turn, the flex circuit 134 is connected to a flex circuit bracket 136 in a conventional manner, which, in turn, is connected through the base deck 102 to a disc drive PCB (not shown) mounted to the underside of the base deck 102. The disc drive PCB provides the disc drive read/write circuitry which controls the operation of the heads 120, as well as other interface and control circuitry for the disc drive 100.

Figure 2:
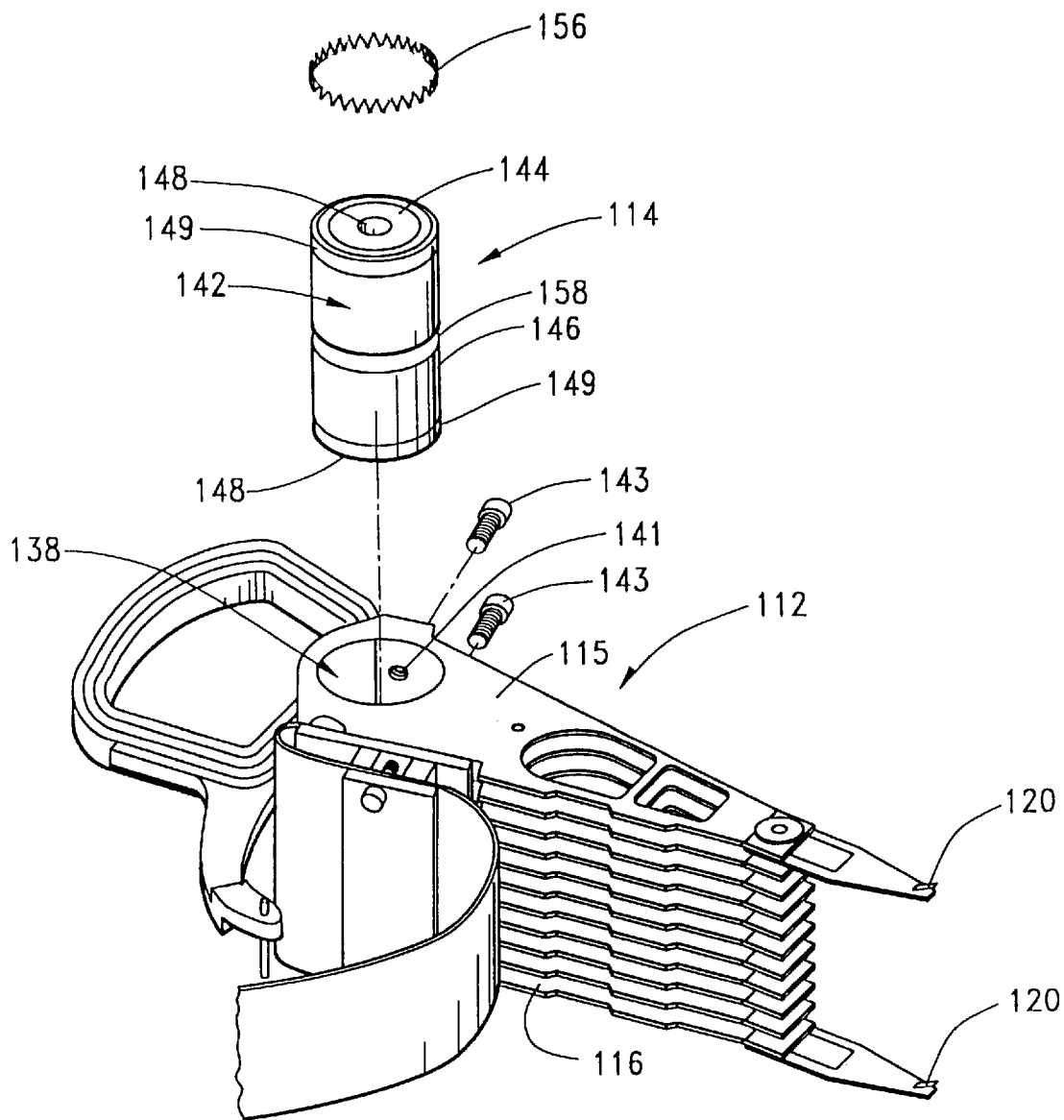
FIG. 2 is a perspective view of the actuator assembly and the pivot shaft bearing assembly of the disc drive of FIG. 1.

Turning now to FIG. 2, shown therein is a perspective, partially exploded view of the actuator assembly 112 and the pivot shaft bearing assembly 114. The pivot shaft bearing assembly 114 is shown removed from a central bore 138 that is formed in the E-block 115. The E-block 115 is typically precision machined from a lightweight material such as aluminum or magnesium to form the central bore 138 as well as the plurality of actuator arms 116. The E-block 115 furthermore has one or more openings 141 for the passage of a fastener 143 as described below to secure the pivot shaft bearing assembly 114.

The pivot shaft bearing assembly 114 has a cartridge bearing 142 having a stationary shaft 144 attached to an inner race of an internal set of ball bearings (not shown), and having a housing 146 attached to an outer race of the ball bearings. The stationary shaft 144 has openings 148 on both ends thereof for receiving disposition of a fastener (not shown) for attachment of the stationary shaft 144 to the base deck 102 and to the top cover 104. In this manner it will be understood that the stationary shaft 144 is rigidly supported by the base deck 102 and the top cover 104 and the housing 146 rotates thereabout in rotational support and positioning of the actuator assembly 112.

Figure 3:
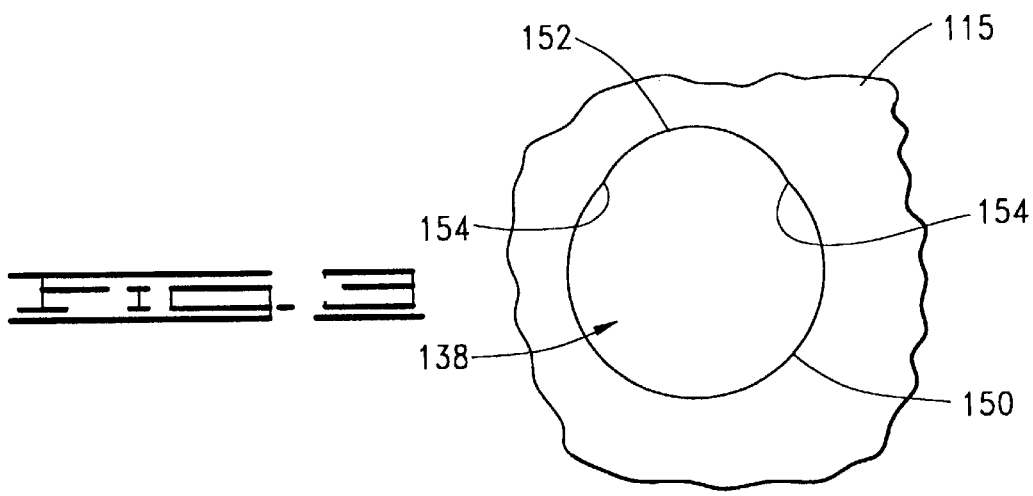
FIG. 3 is a top view of the eccentric bore of the actuator assembly of FIG. 2.

The cartridge bearing 142 has a pair of shoulder portions 149 at the top and bottom ends of the housing 146, the shoulder portions 149 forming surfaces having a greater diameter than the medial portion of the housing 146 therebetween. The bore 138 of the E-block 115 forms an eccentric opening into which the cylindrical cartridge bearing 142 is disposed. FIG. 3 is a top view of a portion of the E-block 115 showing the bore 138 which is formed by the intersection of a primary arcuate opening 150 and a secondary arcuate opening 152. The intersection of the openings 150, 152 forms an alignment edge 154.

Figure 4:
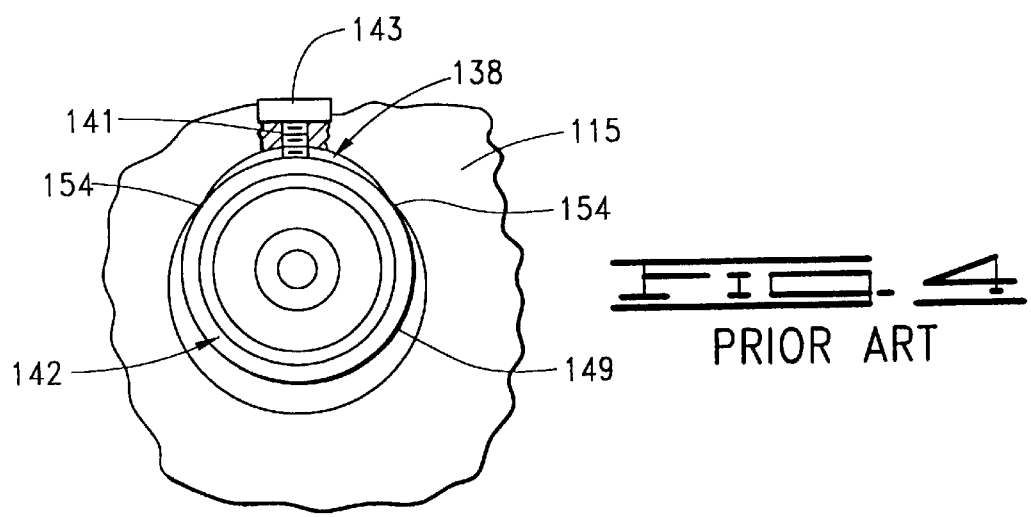
FIG. 4. is a top view of a portion of the actuator assembly of FIG. 2, showing the prior art construction of attaching the E-block to the cartridge bearing.

FIG. 4 is a top view of a portion of the E-block 115 showing the bore 138 of FIG. 3 and with a cartridge bearing 142 installed therein. It will be noted that one or more fasteners 143 pass through the corresponding openings 141 in the E-block 115 to engage the housing 146 of the cartridge bearing 142. In the embodiment shown in FIG. 2 and FIGS. 4 and 5, the fastener 143 is a threaded screw which clearingly passes through the opening 141 in the E-block 115 to threadingly engage threaded apertures (not shown) in the housing 146 of the cartridge bearing 142. In this manner, tightening of the fastener 143 imparts a tensile force on the fastener 143 and urges the cartridge bearing 142 into pressing engagement with the alignment edges 154. The shoulder portions 149 at the top and bottom extents of the cartridge bearing 142, being of a greater diameter than the medial portion of the housing 146, provide the contact surfaces between the cartridge bearing 142 and the alignment edges 154.

FIG. 4 thus illustrates the conventional manner in which the cartridge bearing 142 is attached to the E-block 115. With the shoulder portions 149 of the cartridge bearing 142 making line contact at the alignment edges 154 of the bore 138, a minimal surface contact is provided between the cartridge bearing 142 and the E-block 115.

A limitation of the conventional configuration, however, is that the resilient mounting of the cartridge bearing 142 within the E-block 115, that is the line contact therebetween and the clearance gap elsewhere, permits deflection of the E-block 115 relative to the cartridge bearing 142 in response to the torsion produced during seek operations of the actuator assembly 112 as the actuator assembly 112 seeks a selected data track. The deflection can be significant enough to create an overshoot condition requiring iterative repositioning of the actuator assembly 112 and thus increasing the seek time response.

Figure 5:
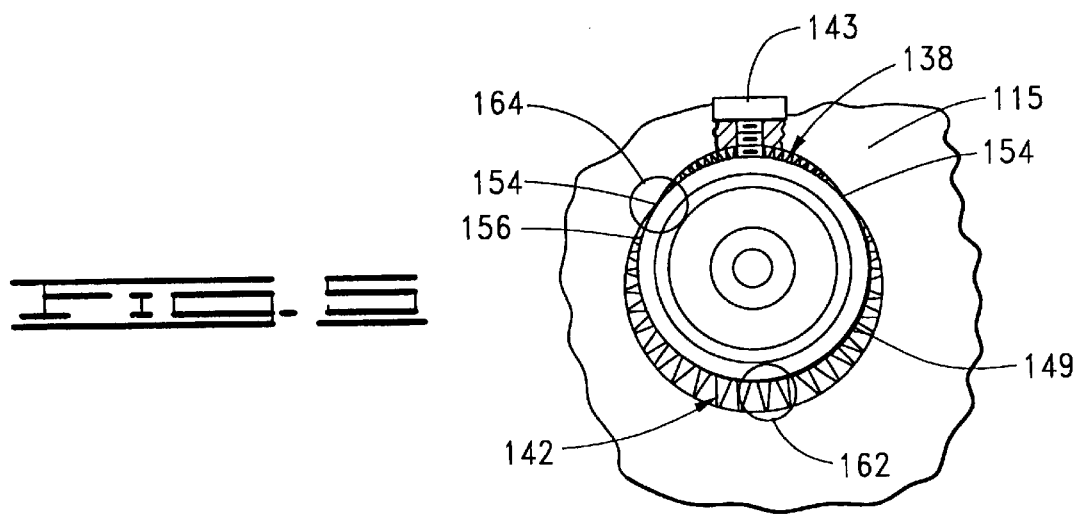
FIG. 5 is a top view of a portion of the actuator assembly of FIG. 2, showing the construction of attaching the E-block to the cartridge bearing in accordance with a preferred embodiment of the present invention.

FIG. 5 shows the cartridge bearing 142 attached to the E-block 115 in a manner in accordance with the present invention, wherein the pivot shaft bearing assembly includes a canted coil spring 156 interposed between the cartridge bearing 142 and the E-block 115. The canted coil spring 156 provides a stabilizing support of the E-block 115 to reduce the amount of deflection of the E-block 115 relative to the cartridge bearing 142 during data track seek operations of the actuator assembly 112.

The canted coil spring 156 is a continuous-loop type having the terminal ends thereof joined together, such as by welding. Such a canted coil spring 156 suitable for use in the present invention is available from Ball Seal Engineering Company, Inc., of Santa Ana, Calif. FIG. 2 shows the medial portion of the housing 146 has a retaining groove 158 into which the canted coil spring 156 is receivingly disposed.

A number of advantages are achieved by the use of the canted coil spring 156 as opposed to commonly known methods of securing the cartridge bearing 142 to the E-block 115 such as by the use of adhesives or by press fitting the mating components. One such advantage is that the canted coil spring 156 extends a uniform support from the cartridge bearing 142 due to the characteristic nature of the canted coil spring 156 wherein each coil independently supports the E-block 115. It will be noted from the following that the individual coils 160 of the canted coil spring 156 act as independent columnar supports which assume varying slopes in response to the clearance between the cartridge bearing 142 and the E-block 115.

Figure 6:
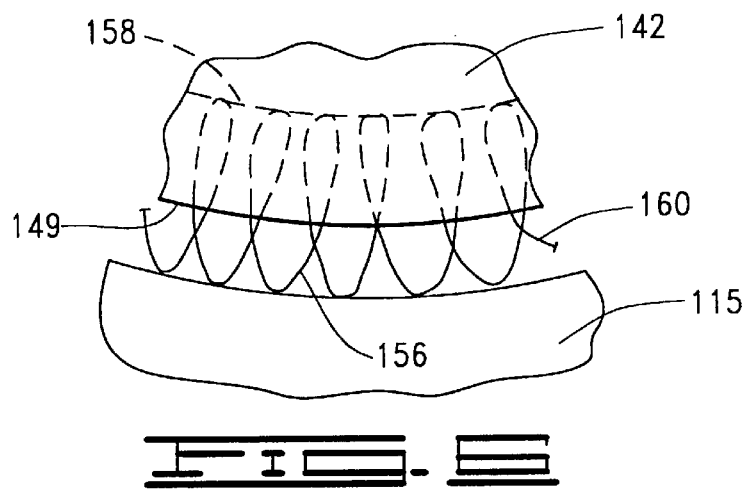
FIG. 6 is a detail view of a portion of the cartridge bearing and E-block of FIG. 5, showing the canted coil spring in an area where the clearance gap between the cartridge bearing and the E-block is substantially constant.

FIG. 6 is a schematic detail of a portion of the canted coil spring 156 of FIG. 5 in the section designated by the numeral 162. In this section the clearance between the E-block 115 and the cartridge bearing 142 is substantially constant. It will be noted that the coils 160 of the canted coil spring 156 are substantially parallel and have an attitude slightly less than perpendicular to the cartridge bearing 142 and the E-block 115.

Figure 7:
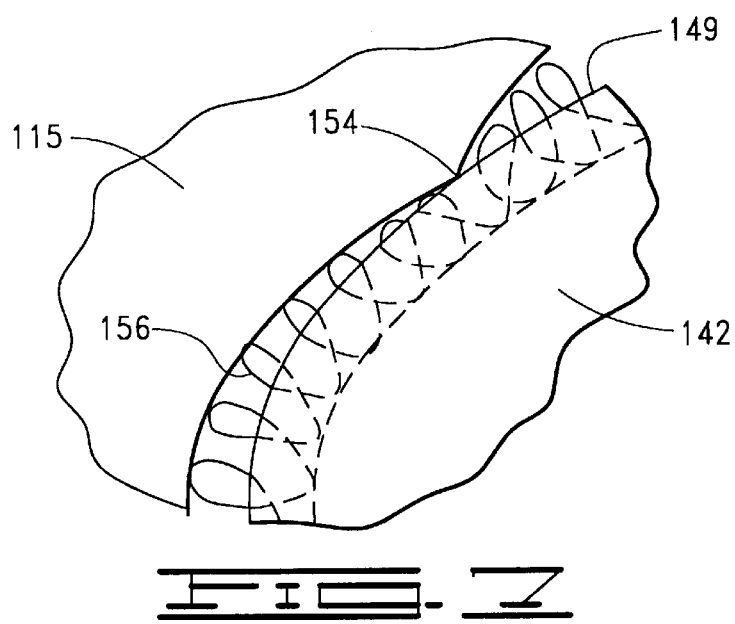
FIG. 7 is a detail view of a portion of the cartridge bearing and E-block of FIG. 5, showing the canted coil spring in an area where the clearance gap between the cartridge bearing and the E-block varies.

FIG. 7, however, is a schematic detail of a portion of the canted coil spring 156 in the section designated by the numeral 164, illustrating the manner in which the individual coils 160 change in sloping attitude where the clearance between the cartridge bearing 142 and the E-block 115 varies. At the contact point of the shoulder portion 149 and the alignment edge 154 the coils 160 approach a tangential relationship to the cartridge bearing 142 as the clearance between the cartridge bearing 142 and the E-block 115 decreases. Coils 160 farther away from the alignment edge 154 are ever increasingly erect and approach the near-perpendicular attitude of the coils 160 of FIG. 6. In this manner the individual coils 160 support the cartridge bearing 142 evenly about the circumference thereof. This support dampens the resonant response and deflection of the E-block 115 relative to the cartridge bearing 142 during data seek operations, thereby reducing the likelihood of an overshoot condition.

Another advantage to the use of the canted coil spring 156 is that resilient support is provided within the entire operating temperature range of the disc drive 100. Typically the E-block 115 is manufactured of a lightweight material such as aluminum or magnesium, while the housing 146 and other internal components of the cartridge bearing 142 are produced from steel to provide the necessary strength and wear characteristics. The disc drive 100 is expected to operate at least within a −40° C. and +70° C. temperature range, which creates a significant change in the clearance between the cartridge bearing 142 and the E-block 115. The change in clearance is the result of differential thermal expansion of the dissimilar materials. A rigidly mounted cartridge bearing 142, such as one adhered or press-fitted into the E-block 115, is constrained such that differential thermal expansion imparts distortion and residual stress into the cartridge bearing 142. This produces increased resonance and frictional resistance in the actuator assembly 112.

Figure 8:
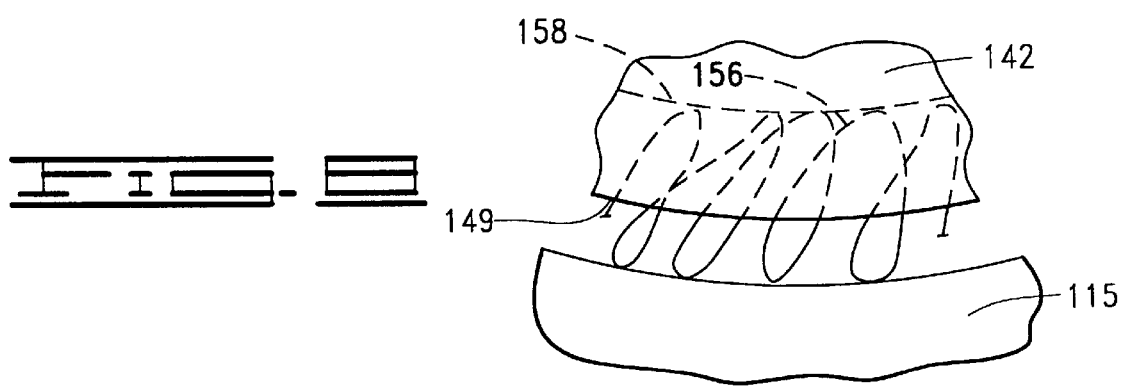
FIG. 8. is a detail view of the portion of the cartridge bearing and E-block of FIG. 6, showing the change in attitude of the spiral wound coils of the canted coil spring in response to a reduction in the clearance between the cartridge bearing and the E-block.

In the present invention, however, a change in the clearance resulting from differential thermal expansion is accommodated by the canted coil spring 156 which conforms to the clearance by varying the angular attitude of the coils 160. FIG. 8 is a schematic representation of the view of FIG. 6 at a different temperature, such that by differential thermal expansion the clearance has decreased between the cartridge bearing 142 and the E-block 115. It will be noted that the angular attitude of the coils 160 of the canted coil spring 156 has decreased from that of the attitude in FIG. 6, in response to the decreased clearance. In this manner the canted coil spring 156 provides a resilient support of the cartridge bearing 142 over the full range of operating temperatures, by the canted coil spring 156 compensating for the variable clearance a constant support is provided thereby without distorting the cartridge bearing 142.

The present invention provides an improved actuator assembly for a disc drive (such as 100), the actuator assembly (such as 112) being rotatably supported on a cartridge bearing (such as 142) which has an outer housing (such as 146) rotatingly supported about a stationary shaft (such as 144) secured between a base deck (such as 102) and a top cover (such as 104). A disc pack assembly comprising a number of discs (such as 108) supported by a spindle motor (such as 106) is likewise supported by the base deck and top cover and interacts with the actuator assembly to read and write data to the discs.

The actuator assembly has an E-block (such as 115) which has a bore (such as 138) which is sized to receivingly engage the cartridge bearing. The bore has a pair of alignment edges (such as 154) and one or more fasteners (such as 143) threadingly engaging the cartridge bearing when the E-block is attached to the cartridge bearing.

The fasteners pressingly engage the cartridge bearing against the alignment edges resulting in a line contact between the cartridge bearing and the E-block, with clearance therebetween elsewhere about the perimeter of the cartridge bearing. A canted coil spring (such as 156) is receivingly disposed in a groove (such as 158) in the housing of the cartridge bearing, the canted coil spring appropriately sized so as to fill the clearance gap between the cartridge bearing and the E-block, thus supporting the E-block in a resilient manner by the canted coils of the coil spring.

It is to be understood that even though numerous characteristics and advantages of various embodiments of the present invention have been set forth in the foregoing description, together with details of the structure and function of various embodiments of the invention, this disclosure is illustrative only, and changes may be made in details especially in matters of structure and arrangement of parts within the principles of the present invention to the full extent indicated by the broad general meaning of the terms in which the appended claims are expressed.

What is claimed is:

1. A pivot mechanism for an actuator assembly of a disc drive to permit rotational motion of an E-block of the actuator assembly, the pivot mechanism comprising:
    a cartridge bearing supporting the E-block; and
    a canted coil spring supported by the cartridge bearing and interposed between the cartridge bearing and the E-block so as to compensate for thermal expansion while minimizing overshoot conditions.

2. The pivot mechanism of claim 1 wherein the cartridge bearing has a peripheral groove for receiving disposition of the canted coil spring.

3. The pivot mechanism of claim 2 wherein the E-block has a bore having an alignment edge, and wherein the cartridge bearing further comprises an upper shoulder and a lower shoulder which operably engage the alignment edge.

4. The pivot mechanism of claim 3 further comprising a fastener which urges the cartridge bearing into pressing engagement with the alignment edge.

5. The pivot mechanism of claim 4 wherein the canted coil spring comprises a plurality of upstanding spiral wound coils that pressingly engage both the cartridge bearing and the E-block to provide resilient support of the E-block.

6. The pivot mechanism of claim 5 wherein the spiral wound coils have a variable angular attitude with respect to the cartridge bearing and the E-block as a clearance gap between the cartridge bearing and the E-block varies.

7. In a disc drive assembly having a base deck, a spindle motor supported by the base deck, a disc connected to the spindle motor for rotation and having a data surface, and a cover which cooperates with the base deck to provide a sealed enclosure, an improved actuator assembly comprising:
    a cartridge bearing assembly supported by the base deck and cover;
    a canted coil spring supported by the cartridge bearing, so as to compensate for thermal expansion while minimizing overshoot conditions; and
    an E-block supported by the cartridge bearing and the canted coil spring.

8. The apparatus of claim 7 wherein the E-block has a bore which receivingly engages the cartridge bearing.

9. The apparatus of claim 8 wherein the bore of the E-block forms an alignment edge.

10. The apparatus of claim 9 wherein the cartridge bearing has an upper shoulder portion and a lower shoulder portion, wherein the shoulder portions operably engage the alignment edge of the E-block bore.

11. The apparatus of claim 10 further comprising a fastener that pressingly engages the cartridge bearing against the alignment edge.

12. The apparatus of claim 11 wherein the cartridge bearing has a peripheral groove for receiving disposition of the canted coil spring.

13. The pivot mechanism of claim 12 wherein the canted coil spring comprises a plurality of upstanding spiral wound coils that pressingly engage both the cartridge bearing and the E-block to provide resilient support of the E-block.

14. The pivot mechanism of claim 13 wherein the spiral wound coils have a variable angular attitude with respect to the cartridge bearing and the E-block as a clearance gap between the cartridge bearing and the E-block varies.

15. A disc drive assembly, comprising:
    a base deck;
    a cover;
    a spindle motor supported by the base deck and cover;
    a disc rotatably supported by the spindle motor, the disc having a data recording surface;
    an actuator assembly supporting a read/write head for reading and writing data to the disc; and
    a pivot shaft bearing assembly comprising a cartridge bearing supported by the base deck and the cover and a canted coil spring supported by the cartridge bearing so as to compensate for thermal expansion while minimizing overshoot conditions.

16. The disc drive assembly of claim 15 wherein the actuator assembly further comprises an E-block supported by the cartridge bearing and the canted coil spring, wherein the canted coil spring is interposed between the cartridge bearing and the E-block.

17. The disc drive assembly of claim 16 wherein the E-block has a bore for receiving disposition of the cartridge bearing, the bore having an alignment edge which operably engages the cartridge bearing.

18. The disc drive assembly of claim 17 wherein the canted coil spring comprises a plurality of upstanding spiral wound coils that pressingly engage both the cartridge bearing and the E-block to provide resilient support of the E-block.

19. A pivot mechanism for an actuator assembly of a disc drive to permit rotational motion of an E-block of the actuator assembly, the pivot mechanism comprising:

a cartridge bearing; and means for supporting the E-block interposed between the cartridge bearing and the E-block.

* * * * *